United States Patent [19]

Tisne

[11] Patent Number: 5,707,633
[45] Date of Patent: Jan. 13, 1998

[54] THERMAL PROTECTION MATERIAL COVERING OF AGGREGATE OF MINERAL FIBERS AND METHOD FOR PRODUCING SAME

[75] Inventor: Jean-Louis Tisne, Martignac, France

[73] Assignee: Societe Anonyme dite Aerospatiale Societe Nationale Industrielle, Montmorency, France

[21] Appl. No.: 665,773

[22] Filed: Jun. 18, 1996

Related U.S. Application Data

[63] Continuation of Ser. No. 139,828, Oct. 22, 1993, abandoned.

[30] Foreign Application Priority Data

Nov. 5, 1992 [FR] France ................................ 92 13573

[51] Int. Cl.$^6$ ................................ B05D 3/00; B05D 1/36
[52] U.S. Cl. ........................................ 427/299; 427/407.1
[58] Field of Search ................................ 427/407.1, 299

[56] References Cited

U.S. PATENT DOCUMENTS 4,952,440  8/1990  Sanmartin et al. .
5,030,518  7/1991  Keller .

FOREIGN PATENT DOCUMENTS 0283385  9/1988  European Pat. Off. .
3741732  12/1988  Germany .

OTHER PUBLICATIONS

Hawley's condensed Chemical Dictionary, 12th Ed. Richard J. Lewis 1993.

French Search Report and Annex.

*Primary Examiner*—Helen Lee
*Attorney, Agent, or Firm*—Greenblum & Bernstein, P.L.C.

[57] ABSTRACT

Thermal protection material coating of an aggregate of mineral fibers, in particular carbon or silicon, is provided with at least one coat of a silicon-based material covering at least the area exposable to the flaking or crumbling sources of the thermal protection device. The coating is especially applicable to thermal protection structures.

11 Claims, No Drawings

THERMAL PROTECTION MATERIAL COVERING OF AGGREGATE OF MINERAL FIBERS AND METHOD FOR PRODUCING SAME

This application is a continuation, of application Ser. No. 08/139,828, filed Oct. 22, 1993, now abandoned.

BACKGROUND OF THE INVENTION

1. Field of the Invention

The present invention relates to thermal protection material of the type formed of an aggregate of short mineral fibers, especially carbon or silicon.

2. Discussion of Background Information

These materials are used to limit the temperature of resistant structures or equipment subjected to radioactive or convective heat flows originating from heat sources, such as exhaust pipe gases or kinetic heat produced when rockets are launched or re-enter the atmosphere.

FR-92.05260 filed in the name of the Applicant describes an embodiment of a device for the thermic protection of a structure with the aid of such materials formed of a silicon or carbon short fiber aggregate bonded by a binder made of the same material, and possibly of an appropriate resin. The aggregate is used in the form of at least one single piece element dimensioned and shaped to size, and glued onto the bearing structure.

These materials, like all low density materials having a number of free fibers on the surface, possess the drawback of allowing fibrils or binder pieces to escape whenever there is any accidental mechanical stressing, such as a slight impact or rubbing, or during mechanical acceptance tests (vibration, stamping, etc) or during a mission (launch, atmosphere re-entry). Thus, they do not satisfy space standards (ESA PSS 01-201: Cleanness and contamination inspection) which require that the particles do not pollute the clean integration rooms and the other elements of the embodied device, namely in particular the mechanisms and the electronics.

FR-92.05260 concerns a material formed of a carbon aggregate whose surface tends to crumble under the action of the gaseous flows along the wall of the thermic protection device. The document suggests that this situation can be resolved by adding a perforated plastic film glued onto the external face of the thermic protection device.

However, this technique does have drawbacks linked to the laying of the film, to the need to perforate the latter, which is not porous, and to the problem of the weight of the film/glue unit.

Furthermore, known solutions implemented to avoid or limit these superficial crumblings of other fiber-based materials cannot be transposed to the materials of the present invention. This is the case with similar materials, such as blocks or tiles used on space shuttles, which have no organic binder, the fibers being linked owing to the embodiment of the elements by means of sintering. However, these elements are coated with a mineral material, such as glass, but mainly to obtain good surface optical characteristics.

This is also the case with mat type thermic protection devices formed of a felt layer of mineral fibers bagged in heat-resistant fabrics and which are coated with an organic product so as to render them water-repellent.

SUMMARY OF THE INVENTION

The object of the invention is to eliminate or at least substantially reduce the superficial crumbling of mineral short fiber aggregate type thermic protection materials, especially carbon or silica, whilst ensuring that the materials possess good optical characteristics and good aptitude on depressurization.

To this effect, the invention concerns a mineral fiber aggregate type thermic protection material, such as carbon or silica, wherein it is formed of at least one coating of a silicon-based material covering at least the surface able to be exposed to the sources of crumbling of the thermic protection device established with the aid of the aggregate material.

The invention also concerns a method for obtaining this coatings, and, in particular, applied to the embodiment of a thermic protection device formed of one or several elements formed of the aggregate material and moulded, shape-machined and glued onto a bearing structure, wherein, after cleaning via suction of the surface of the elements and gluing together and on the bearing structure, it consists of projecting onto the surface of the elements at least one thin coating of a silicone-based material and then carrying out a polymerization-drying.

DETAILED DESCRIPTION OF THE PREFERRED EMBODIMENTS

In this application, it is preferable that the silicone-based covering material is made of the same material as that used for glueing the elements onto the bearing structure, such as silicone resin commercially known as RHODORSIC 730 produced by the RHONE-POULENC company.

Said elements are in particular blocks of similar elements formed of a silica aggregate formed of silica fibers linked together by a binder formed of silica and a phenolic resin.

In order to project the silicon-based material, it is possible to add a suitable diluting agent.

Drying, preferably carried out at a temperature of close to ambient temperature and for a sufficient period of several hours, such as about 24 hours, results in polymerization of the silicon.

The thickness of the covering is determined so as to be sufficient for retaining the fibers, fibrils or other particles, whilst allowing for depressurization of the elements when placing the protection device under a vacuum at the atmosphere outlet after launching. The thickness of the covering is also reduced to a minimum so as to limit the weight.

The silicone-based material is preferably selected from the group of certified space products, that is satisfying the degassing standard ESA PSS 01-702A (Under-vacuum heat test for the selection of space materials), namely: total degassing <1% and condensable volatile <0.1%.

One of these products is, for example, the product commercially known as the space grade DC 6-1125 produced by the DOW CORNING company.

Nevertheless, it is possible to use a silicone-based material not included in the group. In this case, after projection of the material and polymerization-drying, for a period of several hours and at a temperature preferably due to ambient temperature it is possible to carry gut a baking post-treatment under a medium vacuum of about $10^{-4}$ mbars at a temperature of about 120° C. for a period of about 24 hours. This post-treatment is thus able to satisfy the degassing standard.

By way of example, the covering is obtained in two coats with a total thickness of between about 50 and 100 micrometers with a drying between coats of a few minutes.

This mineral fiber aggregate materials surface treatment reduces the possibility of extracting particles and renders the materials compatible with a clean room, category 100,000.

Nevertheless, this treatment does retain good optical characteristics of the thermic protection devices, namely an emissivity >0.8 and a solar absorption <0.5.

The invention is applicable to carbon fiber aggregate thermic protection materials linked together mainly by carbon.

The invention is generally applicable to materials with an aggregate of mineral fibers other than carbon and silica, such as glass fibers, alumina, silicon carbide and zircon.

The silicone-based material is possibly charged to improve the electrical conductivity or the surface optical properties.

Moreover, it is to be noted that the blocks or similar elements made of a mineral fiber aggregate material may, prior to being laid on the bearing structure, be fully covered with the coating of the invention so as to ensure the cleanness of subsequent operations.

I claim:

1. A coating, comprising:
    a thermic protection material comprising an aggregate containing mineral fibers, said aggregate including a surface which is capable of crumbling under action of gaseous flow thereover; and
    at least one layer of a silicone-based material covering at least said surface, said silicone-based material comprising at least one member selected from the group consisting of certified space products.

2. The coating according to claim 1, wherein said mineral fibers are members selected from the group consisting of carbon and silica.

3. The coating according to claim 1, wherein silicone-based material comprises a silicone resin.

4. The coating according to claim 2, wherein said silicone-based material comprises a silicone resin.

5. The coating according to claim 1, wherein said at least one layer has a total thickness of between about 50 and 100 micrometers.

6. The coating according to claim 1, wherein said thermic protection material comprises an aggregate of short silica fibers linked together by a binder comprising silica and a phenolic resin.

7. A coating, comprising:
    a thermic protection material comprising an aggregate containing mineral fibers, said aggregate including a surface which is capable of crumbling under action of gaseous flow thereover; and
    at least one layer of a silicone-based material covering at least said surface, said silicone-based material is not selected from the group consisting of certified space products, and is subjected, after projection and polymerization on said surface, to a baking post-treatment such that after the baking post-treatment, the silicone-based material fulfills the requirements of degassing standard ESA PSS 01-702A.

8. The coating according to claim 7, wherein said silicone-based material is polymerized, dried and then baked, with the baking being effected under a medium vacuum at temperature of about 120° C. for a period of about 24 hours.

9. The coating according to claim 7, wherein said at least one layer has a total thickness of between about 50 and 100 micrometers.

10. The coating according to claim 7, wherein said thermic protection material comprises an aggregate of short silica fibers linked together by a binder comprising silica and a phenolic resin.

11. The coating according to claim 7, wherein said mineral fibers are members selected from the group consisting of carbon and silica.

* * * * *